United States Patent
Jha et al.

(10) Patent No.: US 9,326,207 B2
(45) Date of Patent: Apr. 26, 2016

(54) ENHANCED NODE B AND METHODS FOR PROVIDING SYSTEM INFORMATION UPDATES TO USER EQUIPMENT WITH EXTENDED PAGING CYCLES

(71) Applicant: Intel Corporation, Santa Clara, CA (US)

(72) Inventors: Satish Chandra Jha, Hillsboro, OR (US); Ali Koc, Hillsboro, OR (US); Maruti Gupta, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/140,827

(22) Filed: Dec. 26, 2013

(65) Prior Publication Data

US 2014/0362752 A1   Dec. 11, 2014

Related U.S. Application Data

(60) Provisional application No. 61/832,644, filed on Jun. 7, 2013.

(51) Int. Cl.
*G08C 17/00* (2006.01)
*H04W 36/22* (2009.01)
(Continued)

(52) U.S. Cl.
CPC ............. *H04W 36/22* (2013.01); *H04L 5/0032* (2013.01); *H04L 5/0055* (2013.01); *H04L 5/14* (2013.01); *H04N 21/24* (2013.01); *H04N 21/2401* (2013.01); *H04N 21/26208* (2013.01);
(Continued)

(58) Field of Classification Search
CPC ..................................................... H04W 68/02
See application file for complete search history.

(56) References Cited

U.S. PATENT DOCUMENTS

2005/0185651 A1    8/2005  Rinne
2005/0262261 A1   11/2005  Deshpande
(Continued)

FOREIGN PATENT DOCUMENTS

KR    102011007140 A    6/2011
TW      201505461 A    2/2015
(Continued)

OTHER PUBLICATIONS

3GPP (R2-131890, LG electronics inc. Issues on extended paging cycle in RRC_idle, Fukuoka, Japan, May 20-24, 2013).*
(Continued)

*Primary Examiner* — Maharishi Khirodhar
(74) *Attorney, Agent, or Firm* — Schwegman Lundberg & Woessner, P.A.

(57) ABSTRACT

Embodiments of an enhanced Node B (eNB) and method to provide system information (SI) updates to user equipment (UE) in sleep or idle mode with an extending paging cycle are generally described herein. In some embodiments, a paging message configured to include an optional field to indicate whether there has been a system information (SI) update since a last paging occasion for a UE in sleep or idle mode with an extending paging cycle. System information updates are transmitted by the eNB during a system information modification period that is shorter than a period the extending paging cycle. The optional field may indicate whether or not the UE is to acquire the latest SI update during the current paging occasion.

19 Claims, 4 Drawing Sheets

(51) Int. Cl.

| | | |
|---|---|---|
| H04W 28/02 | (2009.01) | |
| H04N 21/24 | (2011.01) | |
| H04W 28/08 | (2009.01) | |
| H04L 5/00 | (2006.01) | |
| H04L 5/14 | (2006.01) | |
| H04W 72/04 | (2009.01) | |
| H04W 52/02 | (2009.01) | |
| H04W 36/30 | (2009.01) | |
| H04N 21/262 | (2011.01) | |
| H04W 36/24 | (2009.01) | |
| H04W 36/14 | (2009.01) | |
| H04W 36/36 | (2009.01) | |
| H04W 84/12 | (2009.01) | |

(52) U.S. Cl.
CPC ........ *H04W28/0289* (2013.01); *H04W 28/085* (2013.01); *H04W 36/24* (2013.01); *H04W 36/30* (2013.01); *H04W 52/0212* (2013.01); *H04W 72/0406* (2013.01); *H04W 28/08* (2013.01); *H04W 36/14* (2013.01); *H04W 36/36* (2013.01); *H04W 84/12* (2013.01); *Y02B 60/50* (2013.01)

(56) References Cited

U.S. PATENT DOCUMENTS

| | | |
|---|---|---|
| 2006/0019662 A1 | 1/2006 | Andrews et al. |
| 2007/0025304 A1 | 2/2007 | Leelahakriengkrai et al. |
| 2009/0113086 A1 | 4/2009 | Wu et al. |
| 2009/0124245 A1 | 5/2009 | Somasundaram et al. |
| 2010/0135166 A1 | 6/2010 | Ahluwalia |
| 2010/0169732 A1 | 7/2010 | Wu |
| 2010/0329198 A1 | 12/2010 | Madan et al. |
| 2011/0090802 A1 | 4/2011 | Kotrla et al. |
| 2011/0310816 A1 | 12/2011 | Kim et al. |
| 2012/0057478 A1 | 3/2012 | Brännström et al. |
| 2012/0076040 A1 | 3/2012 | Hoshino et al. |
| 2012/0178441 A1 | 7/2012 | Shaheen et al. |
| 2013/0028165 A1 | 1/2013 | Kim et al. |
| 2013/0077543 A1 | 3/2013 | Kim et al. |
| 2013/0166644 A1 | 6/2013 | Sun et al. |
| 2013/0176988 A1 | 7/2013 | Wang et al. |
| 2013/0325684 A1 | 12/2013 | Vogler et al. |
| 2013/0343252 A1 | 12/2013 | Chakraborty et al. |
| 2013/0343293 A1 | 12/2013 | Jersenius et al. |
| 2014/0036873 A1 | 2/2014 | Cheng et al. |
| 2014/0122656 A1 | 5/2014 | Baldwin et al. |
| 2014/0171069 A1 | 6/2014 | Pang et al. |
| 2014/0204771 A1 | 7/2014 | Gao et al. |
| 2014/0287717 A1 | 9/2014 | Golaup et al. |
| 2014/0301241 A1 | 10/2014 | Kumar et al. |
| 2014/0302853 A1 | 10/2014 | Militano et al. |
| 2014/0362689 A1 | 12/2014 | Koc et al. |
| 2014/0362704 A1 | 12/2014 | Jha et al. |
| 2014/0362745 A1 | 12/2014 | Davydov et al. |
| 2014/0362829 A1 | 12/2014 | Kazmi et al. |
| 2014/0366069 A1 | 12/2014 | Ramamurthi et al. |
| 2015/0156743 A1* | 6/2015 | Lee et al. |

FOREIGN PATENT DOCUMENTS

| | | |
|---|---|---|
| WO | WO-2011100492 A1 | 8/2011 |
| WO | WO-2012053840 A2 | 4/2012 |
| WO | WO-2012153961 A2 | 11/2012 |
| WO | WO-2013051975 A1 | 4/2013 |
| WO | WO-2014049198 A1 | 4/2014 |
| WO | WO-2014197493 A1 | 12/2014 |
| WO | WO-2014197501 A1 | 12/2014 |
| WO | WO-2014197571 A1 | 12/2014 |
| WO | WO-2014197576 A1 | 12/2014 |
| WO | WO-2014197682 A1 | 12/2014 |
| WO | WO-2014197719 A1 | 12/2014 |

OTHER PUBLICATIONS

"Backhaul Considerations for User Plane Architectures for Dual Connectivity", Qualcomm Incorporated, R2-131158, 3GPP TSG-RAN2 #81bis, Chicago, USA, [Online] retrieved from the internet: <http://www.3gpp.org/f tp/tsg_ran/wg2_r12/TSGR2_81bis/Docs/>, (Apr. 15-19, 2013), 1-3.

"Correction on implicit HARQ-ACK Resource Determination for PUCCH for Mat 1b with Channel Selection for TDD CA with Different UL-DL Configurations", CATT, R1-132691, 3GPP TSG-RAN WG1 Meeting #73, Fukuoka, Japan, (May 20, 2013), 2-4.

"Correction on UARQ-ACK Transmission for a UE con figured with PUCCH Format 3", Intel Corporation, R1-132684, 3GPP TSG-WG1 Meeting #73, Fukuoka, Japan, (May 20, 2013), 4-5.

"Discussion on S1 split for dual-connectivity", Interdigital Communications, R2-131326, 3GPP TSG-RAN WG2 #81bis, Chicago, USA, [Online]retrieved from the internet: <http://www.3gpp.org/ftp/tsg_ran/wg2_rl2/TSGR2_81bis/Docs/>, (Apr. 15-19, 2013).

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.

"Evolved Universal Terrestrial Radio Access (E-UTRA); Radio Resource Control (RRC); Protocol specification", 3GPP TS 36.331 version 10.6.0 Release 10., (Jul. 2012), 306 pgs.

"Evolved Universal Terrestrial Radio Access Network (E-UTRAN): Architecture description", 3GPP TS 36.401 version 10.4.0 Release 10, (2012), 22 pgs.

"International Application Serial No. PCT/US2014/040734, International Search Report mailed Sep. 12, 2014", 5 pgs.

"International Application Serial No. PCT/US2014/040734, Written Opinion mailed Sep. 12, 2014", 8 pgs.

"International Application Serial No. PCT/US2014/040743, International Search Report mailed Sep. 24, 2014", 3 pgs.

"International Application Serial No. PCT/US2014/040743, Written Opinion mailed Sep. 24, 2014", 5 pgs.

"International Application Serial No. PCT/US2014/040877, International Search Report mailed Sep. 25, 2014", 4 pgs.

"International Application Serial No. PCT/US2014/040877, Written Opinion mailed Sep. 25, 2014", 4 pgs.

"International Application Serial No. PCT/US2014/040882, International Search Report mailed Sep. 25, 2014", 3 pgs.

"International Application Serial No. PCT/US2014/040882, Written Opinion mailed Sep. 25, 2014", 5 pgs.

"International Application Serial No. PCT/US2014/041068, International Search Report mailed Sep. 26, 2014", 3 pgs.

"International Application Serial No. PCT/US2014/041068, Written Opinion mailed Sep. 26, 2014", 5 pgs.

"International Application Serial No. PCT/US2014/041142, International Search Report mailed Oct. 1, 2014", 3 pgs.

"International Application Serial No. PCT/US2014/041142, Written Opinion mailed Oct. 1, 2014", 6 pgs.

"Mobility for dual connectivity", R2-130990, 3GPP TSG RAN WG2 Meeting #81bis, (2013).

"Power Preference Indication and Qos Requirements", ZTE Corporation, R2-130131 in 3GPP TSG-RAN WG2 Meeting #81 St Julians. Malta, (Jan. 28-Feb. 1, 2013).

"Radio link failure handling for dual connectivity", R2-131990, 3GPP TSG RAN WG2 Meeting #82, (May 2013), 1-2.

"Resource Coordination for Small Cells with Non-Ideal Backhaul", Samsung, R1-131027, 3GPP TSG RAN WG1 #72bis, Chicago, USA, (Apr. 15, 2013), 1-2.

"Transparent End-to-End Packet-Switched Streaming Service (PSS) :Progressive Download and Dynamic Adaptive Streaming over HTTP(3GP-DASH)", 3GPP TS 26.247 V 11.5.0 Release 11, (2013), 119 pgs.

"UP Radio Procotol for Dual Connecivity", LG Electronics Inc., R2-131231, 3GPP TSG-RAN2 Meeting #81bis, (Apr. 2013), 1-7.

"User Plane Architecture for Dual-Connectivity", R2-131939, 3GPP TSG-RAN WG2 #82, (May 2013).

(56) References Cited

OTHER PUBLICATIONS

Andrews, M., et al., "Optimal utility based multi-user throughput allocation subject to throughput constraints", IEEE Infocom vol. 4, (2005), 2415-2424.

Jalali, A, et al., "Data throughput of CDMA-HDR a high efficiency-high data rate personal communication wireless system", IEEE 51st Vehicular Technology Conference vol. 03, (2000), 1854-1858.

Liu, X., et al., "A framework for opportunistic scheduling in wireless networks", Computer Networks vol. 41, (2003), 451-475.

Lui, X., et al., "Opportunistic transmission scheduling with resource-sharing constraints in wireless networks", IEEE Selected Areas in Communications vol. 19 (10), (2006), 2053-2064.

Singh, S., et al., "Video capacity and QoE enhancements over LTE", IEEE International Conference on Communications (ICC), (2012), 7071-7076.

Stolyar, A. L., "On the Asymptotic Optimality of the Gradient Scheduling Algorithm for Multiuser Throughput Allocation", Operations Research vol. 53, (2005), 12-25.

"U.S. Appl. No. 14/141,940, Non Final Office Action mailed May 22, 2015", 23 pgs.

"U.S. Appl. No. 14/109,283, Non Final Office Action mailed Jul. 8, 2015", 14 pgs.

"U.S. Appl. No. 14/137,243, Non Final Office Action mailed Jul. 8, 2015", 11 pgs.

"U.S. Appl. No. 14/141,940, Response filed Jul. 7, 2015 to Non Final Office Action mailed May 22, 2015", 23 pgs.

\* cited by examiner

ENHANCED NODE B AND METHODS FOR PROVIDING SYSTEM INFORMATION UPDATES TO USER EQUIPMENT WITH EXTENDED PAGING CYCLES

CROSS-REFERENCE TO RELATED APPLICATIONS

This application claims priority under 35 USC 119(e) to U.S. Provisional Patent Application Ser. No. 61/832,644, filed Jun. 7, 2013, incorporated herein by reference in its entirety.

TECHNICAL FIELD

Embodiments pertain to wireless communications. Some embodiments relate to cellular networks, such as E-UTRAN networks operating in accordance with one of the 3GPP standards for the Long Term Evolution (LTE) (3GPP LTE). Some embodiments relate to system information (SI) updating user equipment (UE) in sleep or idle mode with an extending paging cycle. Some embodiments relate to machine-type communications (MTC).

BACKGROUND

One issue with user equipment, particularly user equipment that operate as MTC devices, is power consumption. One technique used to reduce power consumption is extending the device's paging cycle while the device is in idle mode or sleep mode. In this way, the device wakes up less frequently (e.g., to receive pages) and consumes less power. This may result in the possibility of missed pages that include system information updates making it difficult for the device reconnect with the network.

Thus there are general needs for systems and methods that provide system updates for user equipment (UE) in sleep or idle mode with an extending paging cycle.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
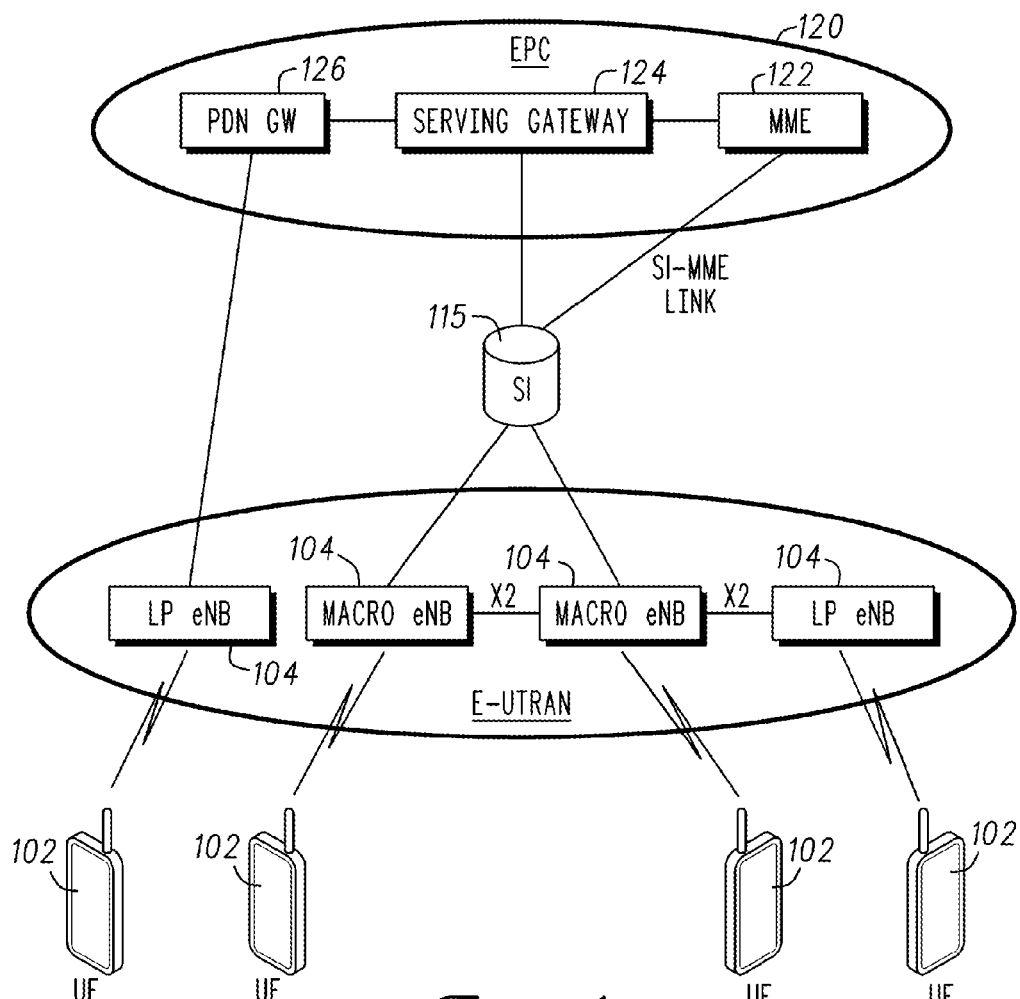
FIG. 1 shows a portion of an end-to-end network architecture of LTE (long term evolution) network with various components of the network in accordance with some embodiments.

FIG. 1 shows a portion of an end-to-end network architecture of LTE (long term evolution) network with various components of the network in accordance with some embodiments. The network comprises a radio access network (e.g., as depicted, the E-UTRAN or evolved universal terrestrial radio access network) and the core network (EPC) 120 coupled together through an S1 interface 115. (Note that for convenience and brevity sake, only a portion of the core network, as well as the RAN, is shown.

The core (EPC) 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNode-B handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates a SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNode-B 104 (macro and micro) terminates the air interface protocol and is usually (if not always) the first point of contact for a UE 102. In some embodiments, an eNode-B 104 may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNode-B and the Serving GW, and the S1-MME, which is a signaling interface between the eNode-B and the MME. The X2 interface is the interface between eNode-Bs (at least between most, as will be addressed below regarding micro eNBs). The X2 interface comprises two parts, the X2-C and X2-U. The X2-C is the control plane interface between eNode-Bs, while the X2-U is the user plane interface between eNode-Bs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNode-B for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 could be implemented with a picocell eNB since it is coupled to a macro eNB via an X2 interface. Picocell eNBs or other LP eNBs for that matter) may incorporate some or all functionality of a macro eNB. In some cases, this may be referred to as an access point base station or enterprise femtocell.

As discussed above, one issue with UEs, particularly UEs that operate as MTC devices, is power consumption. One technique used to reduce power consumption is extending the device's paging cycle while the device is in idle mode or sleep mode. In this way, the device wakes up less frequently (e.g., to receive pages) and consumes less power. This may result in the possibility of missed pages that include system information updates making it difficult for the device reconnect with the network.

In the current 3GPP spec, if a UE 102 is configured with an extended paging cycle (e.g., longer than SI change notification period), the UE 102 can miss the SI change notification. As a result, it may initiate a RRC connection establishment/reestablishment with invalid SI which is not allowed in the current 3GPP specification. Currently there is no mechanism which can assure that a UE can initiate RRC connection establishment/reestablishment with invalid SI in case of an extended paging cycle. Embodiments disclosed herein provide assurance that a UE 102 in sleep or idle mode with an extended paging cycle will initiate an RRC connection establishment/reestablishment with valid SI.

Currently, the maximum paging cycle is limited to 2.56 seconds, which is inadequate for reducing power consumption. Solutions allowing the extension of the paging cycle have been proposed for both MTC and non-MTC devices. The need for the extended paging cycle for MTC devices can be as long as in the range of hours. Paging is needed for a UE 102 (i.e., MTC or non-MTC device) in idle mode to receive various system information updates and indication of downlink traffic for the UE 102. Therefore, reliable reception of paging may be crucial in LTE network.

A UE 102 is not to initiate an RRC Connection establishment or an RRC Connection Reestablishment Request message until it has valid version of system informations (SIs) such as a MIB, a SIB1, a SIB2, etc. Whenever there is change in any SI, a UE 102 is notified through paging once or several times within a time period called modification period. Modification period is defined as modification Period Coeff {=n2, n4, n8, n16} times default Paging Cycle {=rf32, rf64, rf128, rf256}; which means modification period can vary from 640 ms to 40960 ms (40.96 s) based on a current system configuration, for example. Since an extended paging cycle can be longer than 40.96 s, for example, a UE may miss the SI change notification. This can result in having invalid SI at a UE 102 as the UE 102 may not be aware that SI has changed.

Figure 2:
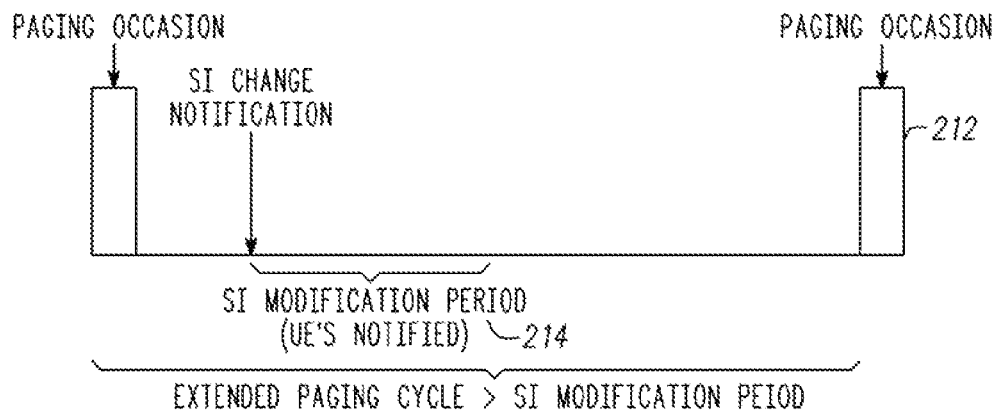
FIG. 2 illustrates how a UE in sleep or idle mode with an extending paging cycle can miss a system information change notification.

FIG. 2 illustrates how a UE in sleep or idle mode with an extending paging cycle can miss a system information change notification. Embodiments disclosed herein help address the problem of the UE 102 not being up-to-date with the latest SI update in cases where the UE 102 has been configured with an extended paging cycle having a period 216 longer than the SI change notification period 214 (also known as modification period) as can be seen from FIG. 2.

As mentioned above, there needs to be a mechanism to help guarantee that a UE 102 uses valid SI for several reasons. Some of them include being able to receive a paging message even after the paging frame calculation has changed due to change in SI after waking up from extended paging cycles.

Embodiments disclosed herein help assure that a UE 102 updates SI whenever SI is changed before initiating RRC connection establishment and/or reestablishment or to ensure timely receipt of downlink data, particularly when extended paging cycle is longer than the current modification period. Embodiments disclosed herein address different use cases of what happens if a UE 102 does not have the latest SI update.

Case 1: The UE 102 is able to receive the Paging Message even with change in System information. In these embodiments, if the extended paging cycle is longer than maximum modification period (e.g., 16×2.56=40.96 s) and there was a SI change notification event during the UE's last paging/Idle sleep, then the eNB 104 may be arranged to keep track of whether the upcoming Paging Occasion (PO) include UEs with an extended paging cycle.

If yes, then the eNB 104 may send out a paging message to let the UEs know that there was an SI update since their last PO. Since UEs in connected mode and other UEs with paging cycles up to 2.56 seconds will have already received this message earlier, embodiments disclosed herein help make sure that those UEs do not have to read all the SIBs to get the same update again. To ensure that this message is targeted only towards UEs with extended paging cycles rather than all UEs in connected mode, embodiments disclosed herein may modify the paging message by adding another field as described below.

Currently, fields in the paging message are optional and this new field may also be optional. This new field may be referred to as the "systemInfoModificationExtendedPagingCycle" or the "SIMExtPC" field. Thus, the eNB 104 may send a paging message with this field set to true, if there has been an update and set to false, if there has been no update since last PO. If set to true, then the UE 102 will acquire the latest SI update before going back to sleep. This paging message is sent even if there is no downlink data for any of the UEs in that particular PO or when there is no CMAS/ETWS/SI update information. This ensures that the UE always receives a page during its PO, if it is in extended paging cycle. CMAS may refer to Commercial Mobile Alerting System information and ETWS may refer to Earthquake and Tsunami Warning System information.

Figure 3:
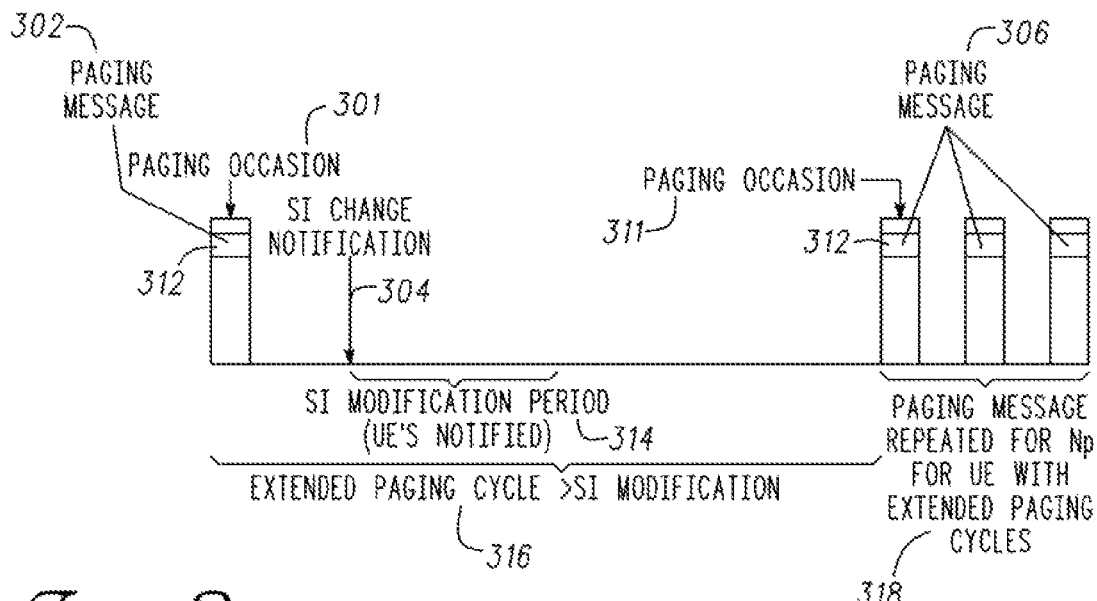
FIG. 3 illustrates the use of a paging message that includes an optional field to indicate whether there has been a system information update since a last paging occasion in accordance with some embodiments.

To help ensure receipt of this configured paging message, it may be repeated every radio frame starting from the Paging frame for Np frames to ensure robustness. Np may be broadcast as part of system information and may be stored by the UE beforehand. An example of this is illustrated in FIG. 3.

In accordance with some embodiments, Paging Message Paging field descriptions may include:
    cmas-Indication; If present; indication of a CMAS notification.
    cn-Domain; Indicates the origin of paging.
    eab-ParamModification; If present; indication of a EAB parameters (SIB14) modification.
    etws-Indication; If present; indication of an ETWS primary notification and/or ETWS secondary notification.

Imsi; The International Mobile Subscriber Identity, a globally unique permanent subscriber identity.

systemInfoModification; If present; indication of a BCCH modification other than SIB10, SIB11, SIB12 and SIB14.

ue-Identity; Provides the NAS identity of the UE that is being paged.

systemInfoModificationExtendedPagingCycle; If present; indication that there has been a modification in System Information and is directed specifically towards UEs that missed the systemInfoModification notification due to extended paging cycles greater than the system modification period.

Case 2: The UE is unable to receive Paging Message during PO. Sometimes, it is possible that a UE 102 may not be able to get the paging message itself due to the fact that the Paging Frame has shifted due to change in System Information (i.e., the parameter nB broadcast in SIB2 and the UE is unaware of this shift due to extended paging cycle). If this is the case, then the UE 102 will miss the PO itself.

In accordance with some embodiments, if a UE 102 is currently in an extended paging cycle, then before any PO, instead of waking up at the PO, the UE 102 may wake up several (e.g., at the most three) radio frames before the next actual PO to read the MIB, which is transmitted every radio frame at a fixed location. Once it reads the MIB, it can find the location of SIB1, which is transmitted every 20 ms and will be transmitted either in the next frame or the frame following it. The UE reads SIB1, which will allow it to find out if system information has been changed or not either in SIB1 or any other SIBs. The information whether SIB1 has been changed can be known by comparing the fields in the SIB1 with those already stored at the UE 102 and those of other SIBs can be known by comparing the value of the System-Information-Value-Tag which is updated whenever there is any change in the other SIBs. If the UE 102 finds out that the System-Information-Value-Tag has changed and also it is unable to read the paging message during PO, it is possible that it was unable to read it because of some change in the System-Information-Value-Tag that changed the location of paging frame. Thus, the UE 102 will assume that it may have potentially missed a Paging message.

In this case, even if the UE 102 has no data to send, it will perform RRC Connection procedure by first performing the RACH procedure and then sending a RRC Connection Request with a new cause, namely MissedPagingMessage in it. The eNB 104 receives the message and if there was no page directed towards the UE 102, the eNB 104 may send a message with an RRC Connection Setup Reject with a No Missed Paging Message indication. If there is a page waiting for the UE, the eNB 104 proceeds with the connection request as usual.

Figure 4:
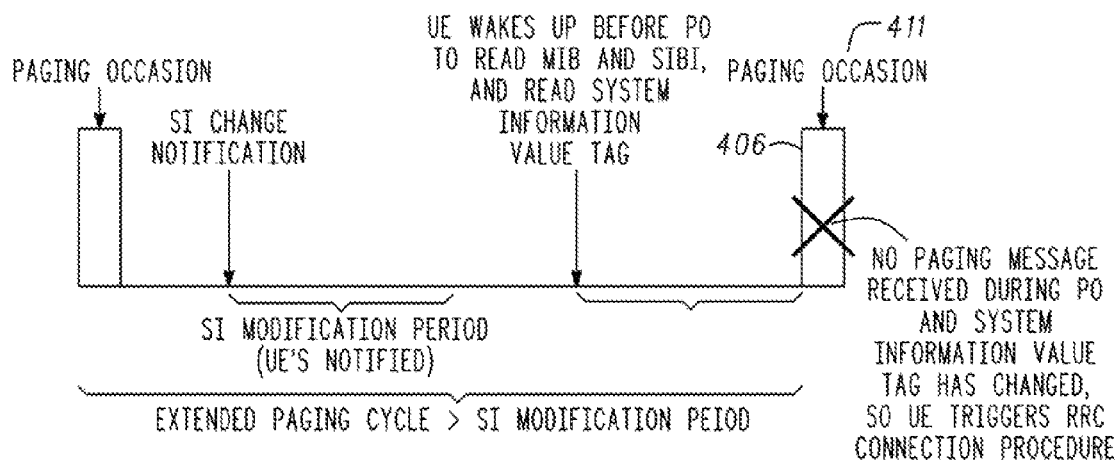
FIG. 4 illustrates how a UE in sleep or idle mode with an extending paging cycle can acquire a latest system information update when unable to receive a paging message during a paging occasion in accordance with some embodiments.

FIG. 4 illustrates how a UE in sleep or idle mode with an extending paging cycle can acquire a latest system information update when unable to receive a paging message during a paging occasion in accordance with some embodiments. FIG. 4 shows that a UE may wakeup before PO to read the MIB and SIB and to find the System-Information-Value-Tag field. These embodiments are discussed in more detail below.

Embodiments disclosed herein provide methods by which the UE may acquire valid System Information when it is in extended paging cycles lasting longer than the system modification period. In some embodiments, a new field called systemInfoModicationExtendedPagingCycle may be sent by the eNB for those UEs which sleep for long periods of time and may have missed SI updates. In some embodiments, a paging message is repeated to ensure robustness in case the UE misses the first PO after wakeup. This repetition parameter will be part of the SIBs. Some embodiments address when the UE may not be able to receive the Paging message itself due to change in SI. In some embodiments, a UE with an extended paging cycle may wake up at most 3 radio frames earlier and obtain MIB and SIB1. In case of no changes, the UE checks the PO and responds as usual. In case it detects changes in SI update and if it also misses receiving a page, it triggers the RRC connection procedure in order to ensure that it has not in fact missed a page. In some embodiments, the UE will send a RRC connection request with a new message type to show that it is connecting because it missed a page. In some embodiments, the eNB 104 will respond with a RRC Connection Request Reject if there is no page for that UE 102. If there is a page for the UE 102, then the eNB 104 will respond with an RRC Connection Setup and go ahead with the connection establishment process.

In accordance with embodiments, an enhanced Node B (eNB) 104 may be configured to provide system information (SI) updates to user equipment (UE) in sleep or idle mode with an extending paging cycle. In these embodiments, the eNB 104 may transmit a paging message 302 or 306 (see FIG. 3) that includes an optional field 312 to indicate whether there has been a system information (SI) update since a last paging occasion (PO) 301 for user equipment (UE) 102 in sleep or idle mode with an extending paging cycle. In these embodiments, system information updates are transmitted by the eNB 104 during a system information modification period 314 that is shorter than the extending paging cycle period 316 causing the UE to possible miss the SI update change notification 304.

In some embodiments, the optional field 312 is a system information update modification for extended paging cycle (SIMExtPC) field (e.g., System Info Modification Extended Paging Cycle field).

In some embodiments, when a SI update change notification 304 has been issued during a sleep period of the UE 102, the eNB 104 may configure the SIMExtPC field 312 of the paging message 306 (e.g., SIMExtPC=true) to indicate to the UE 102 to acquire a latest SI update during a current paging occasion 311 (i.e., prior to going back to sleep).

In some embodiments, when a SI update change notification 304 has not been issued during the sleep period of the UE 102 in sleep or idle mode with an extending paging cycle, the eNB 104 may configure the SIMExtPC field 312 of the paging message 306 (e.g., SIMExtPC=false) to indicate to the UE 102 that a latest SI update does not need to be acquired.

In some embodiments, the eNB 104 may determine when an upcoming paging occasion 311 includes a UE 102 in sleep or idle with an extending paging cycle, and when the upcoming paging occasion 311 does include a UE 102 in sleep or idle mode with an extending paging cycle, the eNB 104 may be arranged to determine if a SI update change notification 304 has been issued during the sleep period of the UE 102, and configure the SIMExtPC field 312 of the paging message 306 for transmission in the upcoming paging occasion 311 to indicate whether or not the UE 102 is to acquire the latest SI update.

In some embodiments, the paging message 302 or 306 with the SIMExtPC field 312 may be transmitted to a UE 102 in sleep or idle mode with an extending paging cycle whether or not there is downlink data available for the UE 102.

In some embodiments, the eNB 104 may repeat transmission 318 of the paging message 306 after the paging occasion 311 for a predetermined number of frames (Np) (e.g., for robustness) when the SIMExtPC field 312 of the paging message 306 (e.g., SIMExtPC=true) is configured to indicate to the UE 102 to acquire the latest SI update. In these embodiments, UEs that are in sleep or idle mode with an extending paging cycle are arranged to receive repeated transmissions 318 of configured paging messages to help assure that a latest SI update is acquired.

UEs that are in an active or connected mode and UEs that are sleep or idle mode with a standard paging cycle may be configured to refrain from responding to paging messages that have the SIMExtPC field 312 (i.e., whether or not the SIMExtPC field 312 is configured to indicate to acquire a latest SI update). These UEs would have already received a SI update message earlier (e.g., during the SI modification period 314) and do not need to read or respond to these configured paging messages.

Figure 5:
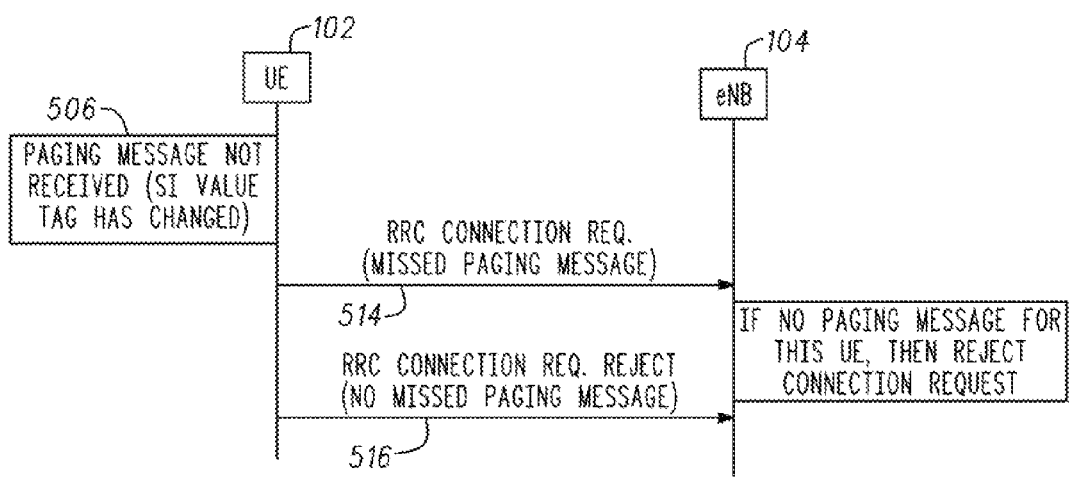
FIG. 5 illustrates a radio-resource control (RRC) connection request procedure in accordance with some embodiments.

In some embodiments, when the UE 102 (i.e., in sleep or idle mode with an extending paging cycle) is unable to receive the paging message 406 during a paging occasion 411 (see FIG. 4), the UE 102 may be arranged to waking-up a predetermined number of frames (e.g., three frames) before the paging occasion 411 to a receive a master information block (MIB) (i.e., which is transmitted every frame). In these embodiments, the UE 102 may be arranged to determine a location of a system information block (SIB) (e.g., an SIB type 1 (SIB1)) from the MIB, and receive the SIB1 (within a system information message) to determine if the system information has been updated. When the system information has been updated, the UE 102 may trigger a radio-resource control (RRC) connection procedure with an enhanced node B (eNB) 104 by sending an RRC connection request message 514 (see FIG. 5) that includes a missing paging message notification. When the system information has not been updated, receiving a paging message during a next-scheduled paging occasion 412 (as usual).

In some embodiments, the UE 102 may be arranged to receive an RRC connection setup reject message 516 (FIG. 5) from the eNB 104 when a paging message was not missed and receive an RRC connection response from the eNB 104 to set up a connection with the eNB 104 when a paging message 506 was missed. In some embodiments, the RRC procedure is performed regardless of whether the UE 102 has uplink data to send. In some embodiments, to determine if the system information has been updated, the UE 102 may compare a value of a system information value tag stored in the UE.

Figure 6:
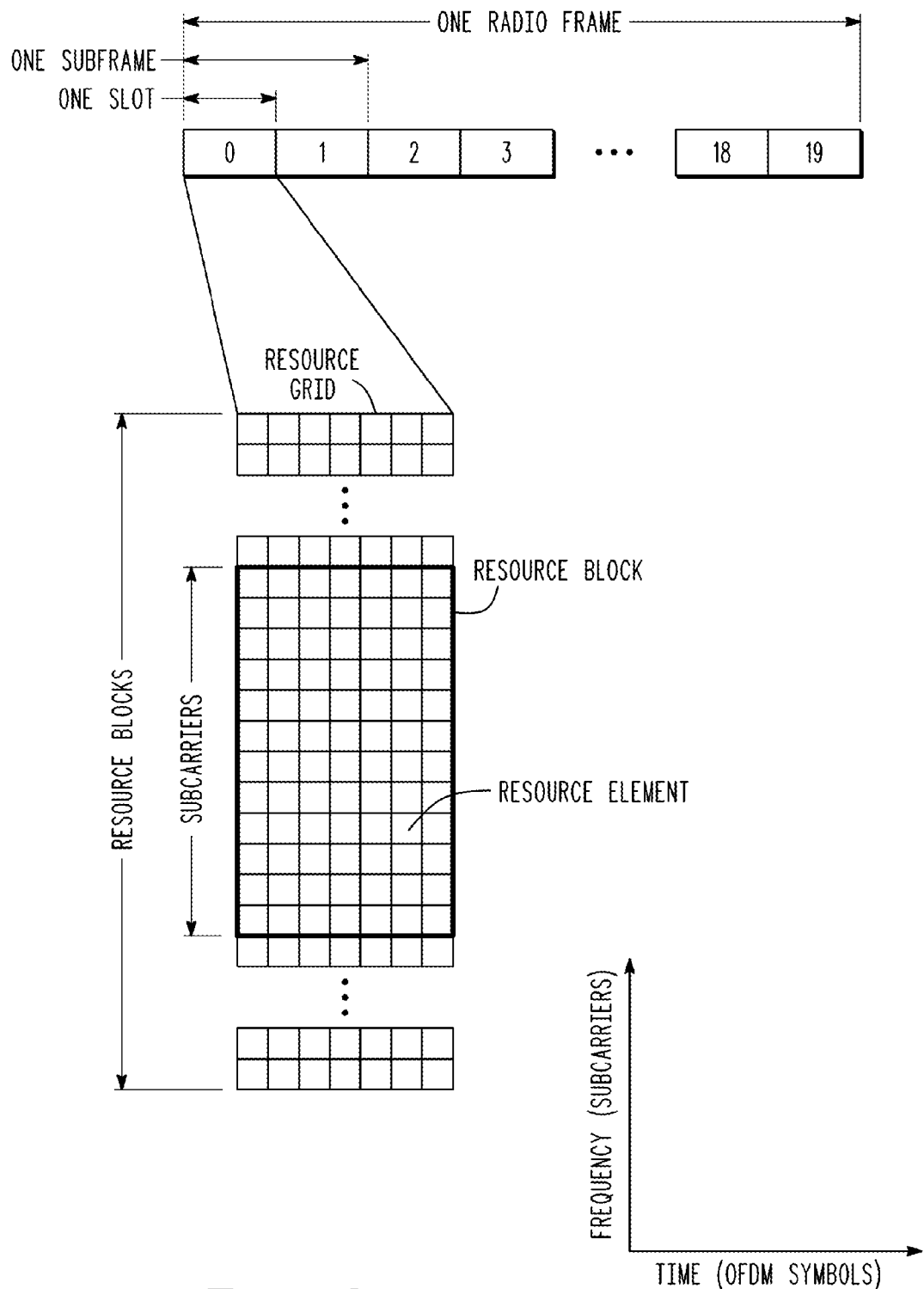
FIG. 6 shows a structure for the downlink resource grid for downlink transmissions from an enhanced node B (eNB) to a UE.

FIG. 6 shows a structure for the downlink resource grid for downlink transmissions from an eNB to a UE. The depicted grid illustrates a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements. In the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level L=1, 2, 4, or 8).

Figure 7:
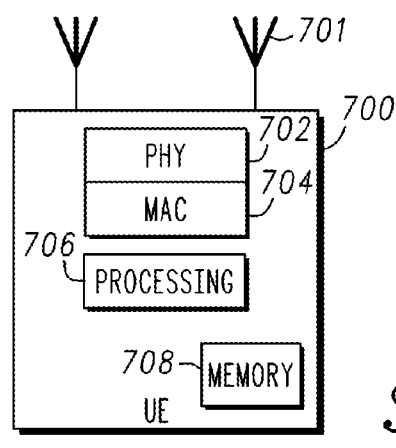
FIG. 7 illustrates a UE in accordance with some embodiments.

FIG. 7 illustrates a functional block diagram of a UE in accordance with some embodiments. UE 700 may be suitable for use as UE 102 (FIG. 1). The UE 700 may include physical layer circuitry 702 for transmitting and receiving signals to and from eNBs 104 (FIG. 1) using one or more antennas 701. UE 700 may also include medium access control layer (MAC) circuitry 704 for controlling access to the wireless medium. UE 700 may also include processing circuitry 706 and memory 708 arranged to perform the operations described herein.

In some embodiments, the UE 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 700 may include one or more of a keyboard, a display, a non-volatile memory port, multiple antennas, a graphics processor, an application processor, speakers, and other mobile device elements. The display may be an LCD screen including a touch screen.

The one or more antennas 701 utilized by the UE 700 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 700 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 700 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 700 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 700 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2$a$ or 2$b$ containing the CQI/PMI or RI.

In these embodiments, the CQI may be an indication of the downlink mobile radio channel quality as experienced by the UE 700. The CQI allows the UE 700 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by an enhanced Node B (eNB) to provide system information (SI) updates to user equipment (UE) in sleep or idle mode with an extending paging cycle, the method comprising:
   determining whether an upcoming paging occasion includes a UE in sleep or idle with an extending paging cycle;
   determining whether there has been a SI update since a last paging occasion for the UE;

in response to determining that there has been a SI update since the last paging occasion for the UE, transmitting a paging message, including an optional field to indicate that there has been a SI update since the last paging occasion for the UE, independent of whether there is downlink data available for the UE, wherein system information updates are transmitted by the eNB during a system information modification period that is shorter than a period of the extending paging cycle.

2. The method of claim 1 wherein the optional field is a system information update modification for extended paging cycle (SIMExtPC) field.

3. The method of claim 2 wherein when a SI update change notification has been issued during a sleep period of the UE, the method further comprises configuring the SIMExtPC field of the paging message to indicate to the UE to acquire a latest SI update during a current paging occasion.

4. The method of claim 3 wherein when a SI update change notification has not been issued during the sleep period of the UE in sleep or idle mode with an extending paging cycle, the method further comprises configuring the SIMExtPC field of the paging message to indicate to the UE that a latest SI update does not need to be acquired during the current paging occasion.

5. The method of claim 1 wherein UEs that are in an active or connected mode and UEs that are sleep or idle mode with a standard paging cycle are configured to refrain from responding to the paging message.

6. The method of claim 1 further comprising:
in response to determining that there has been a SI update since the last paging occasion for the UE, repeating transmission of the paging message after the paging occasion for a predetermined number of frames.

7. The method of claim 1 wherein:
the paging message is transmitted independent of whether there is Commercial Mobile Alerting System (CMAS), Earthquake and Tsunami Warning System (ETWS) or SI update information.

8. A method performed by an enhanced Node B (eNB) to provide system information (SI) updates to user equipment (UE) in sleep or idle mode with an extending paging cycle, the method comprising:
transmitting a paging message that includes a system information update modification for extended paging cycle (SIMExtPC) field to indicate whether there has been a SI update since a last paging occasion for a UE in sleep or idle mode with an extending paging cycle,
wherein system information updates are transmitted by the eNB during a system information modification period that is shorter than a period of the extending paging cycle,
wherein:
when a SI update change notification has been issued during a sleep period of the UE, the method further comprises configuring the SIMExtPC field of the paging message to indicate to the UE to acquire a latest SI update during a current paging occasion, and
when a SI update change notification has not been issued during the sleep period of the UE in sleep or idle mode with an extending paging cycle, the method further comprises configuring the SIMExtPC field of the paging message to indicate to the UE that a latest SI update does not need to be acquired during the current paging occasion,
determining when an upcoming paging occasion includes a UE in sleep or idle with an extending paging cycle, and
when the upcoming paging occasion does include a UE in sleep or idle mode with an extending paging cycle, the method further includes:
determining whether a SI update change notification has been issued during the sleep period of the UE; and
configuring the SIMExtPC field of the paging message for transmission in the upcoming paging occasion to indicate whether the UE is to acquire the latest SI update during the current paging occasion.

9. The method of claim 8 wherein the paging message with the SIMExtPC field is transmitted to a UE in sleep or idle mode with an extending paging cycle whether there is downlink data available for the UE.

10. The method of claim 9 further comprising repeating transmission of the paging message after the paging occasion for a predetermined number of frames when the SIMExtPC field of the paging message is configured to indicate to the UE to acquire the latest SI update,
wherein UEs that are in sleep or idle mode with an extending paging cycle are arranged to attempt to receive repeated transmissions of paging messages configured with the SIMExtPC field to help assure that a latest SI update is acquired.

11. An enhanced node B (eNB) arranged to provide system information (SI) updates to user equipment (UE) in sleep or idle mode with an extending paging cycle, the eNB comprising:
physical layer circuitry arranged to communicate with the UE; and
processing circuitry arranged to:
configure the physical layer circuitry to transmit a SI update during a system information modification period;
determine that the UE is in sleep or idle mode with an extending paging cycle that is longer than a period of the system information modification period;
determine that there has been a SI update since a last paging occasion for the UE; and
in response to determining that there has been a SI update since the last paging occasion for the UE, configure the physical layer circuitry to transmit a paging message, including an optional field to indicate whether there has been a SI update since a last paging occasion for the UE, independent of whether there is downlink data available for the UE.

12. The eNB of claim 11 wherein the optional field is a system information update modification for extended paging cycle (SIMExtPC) field.

13. The eNB of claim 12 wherein when a SI update change notification has been issued during a sleep period of the UE, the eNB is to configure the SIMExtPC field of the paging message to indicate to the UE to acquire a latest SI update during a current paging occasion.

14. The eNB of claim 13 wherein when a SI update change notification has not been issued during the sleep period of the UE in sleep or idle mode with an extending paging cycle, the eNB is arranged to configure the SIMExtPC field of the paging message to indicate to the UE that a latest SI update does not need to be acquired during the current paging occasion.

15. An enhanced node B (eNB) arranged to provide system information (SI) updates to user equipment (UE) in sleep or idle mode with an extending paging cycle, the eNB comprising:

physical layer circuitry arranged to communicate with the UE; and processing circuitry arranged to:
  transmit a paging message that includes a system information update modification for extended paging cycle (SIMExtPC) field to indicate whether there has been a SI update since a last paging occasion for a UE in sleep or idle mode with an extending paging cycle,
wherein system information updates are transmitted by the eNB during a system information modification period that is shorter than a period of the extending paging cycle,
when a SI update change notification has been issued during a sleep period of the UE, the eNB is to configure the SIMExtPC field of the paging message to indicate to the UE to acquire a latest SI update during a current paging occasion,
wherein when a SI update change notification has not been issued during the sleep period of the UE in sleep or idle mode with an extending paging cycle, the eNB is arranged to configure the SIMExtPC field of the paging message to indicate to the UE that a latest SI update does not need to be acquired during the current paging occasion,
wherein the processing circuitry is arranged to determine when an upcoming paging occasion includes a UE in sleep or idle with an extending paging cycle, and
when the upcoming paging occasion does include a UE in sleep or idle mode with an extending paging cycle, the processing circuitry is further arranged to:
  determine whether a SI update change notification has been issued during the sleep period of the UE; and
  configure the SIMExtPC field of the paging message for transmission in the upcoming paging occasion to indicate whether the UE is to acquire the latest SI update during the current paging occasion.

16. The eNB of claim 15 wherein the paging message with the SIMExtPC field is transmitted to a UE in sleep or idle mode with an extending paging cycle whether there is downlink data available for the UE.

17. The eNB of claim 16 wherein the eNB is further arranged to repeat transmission of the paging message after the paging occasion for a predetermined number of frames when the SIMExtPC field of the paging message is configured to indicate to the UE to acquire the latest SI update, and
  wherein UEs that are in sleep or idle mode with an extending paging cycle are arranged to attempt to receive repeated transmissions of paging messages configured with the SIMExtPC field to help assure that a latest SI update is acquired.

18. A non-transitory computer-readable storage medium that stores instructions for execution by one or more processors of an evolved NodeB (eNB) to communicate with one or more user equipment (UEs), the one or more processors to configure the eNB to:
  determine whether an upcoming paging occasion includes a UE in sleep or idle with an extending paging cycle;
  determine whether there has been a SI update since a last paging occasion for the UE;
  in response to determining that there has been a SI update since the last paging occasion for the UE, transmit a paging message independent of whether there is downlink data available for the UE, the paging message including an optional field to indicate that there has been a SI update since the last paging occasion for the UE,
  wherein system information updates are transmitted by the eNB during a system information modification period that is shorter than a period of the extending paging cycle.

19. The medium of claim 18, wherein the one or more processors further configure the eNB to:
  in response to determining that there has been a SI update since the last paging occasion for the UE, repeat transmission of the paging message after the paging occasion for a predetermined number of frames.

* * * * *